US009952650B2

(12) United States Patent
Chen et al.

(10) Patent No.: US 9,952,650 B2
(45) Date of Patent: Apr. 24, 2018

(54) HARDWARE APPARATUS AND METHOD FOR MULTIPLE PROCESSORS DYNAMIC ASYMMETRIC AND SYMMETRIC MODE SWITCHING

(71) Applicant: Futurewei Technologies Inc., Plano, TX (US)

(72) Inventors: Wei Chen, San Diego (CA); Tongzeng Yang, San Diego, CA (US); Anthony Mazzola, Ramona, CA (US)

(73) Assignee: Futurewei Technologies, Inc., Plano, TX (US)

( * ) Notice: Subject to any disclaimer, the term of this patent is extended or adjusted under 35 U.S.C. 154(b) by 123 days.

(21) Appl. No.: 14/516,314

(22) Filed: Oct. 16, 2014

(65) Prior Publication Data

US 2016/0109921 A1   Apr. 21, 2016

(51) Int. Cl.
| G06F 1/32 | (2006.01) |
| G06F 1/10 | (2006.01) |
| G06F 9/46 | (2006.01) |

(52) U.S. Cl.
CPC ............... *G06F 1/324* (2013.01); *G06F 1/10* (2013.01); *G06F 1/3243* (2013.01); *G06F 1/3275* (2013.01); *G06F 1/3287* (2013.01); *G06F 1/3296* (2013.01); *G06F 9/46* (2013.01); *Y02B 60/1217* (2013.01); *Y02B 60/1239* (2013.01); *Y02B 60/1285* (2013.01)

(58) Field of Classification Search
None
See application file for complete search history.

(56) References Cited

U.S. PATENT DOCUMENTS

| 5,774,704 A * | 6/1998 | Williams | ............... G06F 1/08 713/501 |
| 5,964,881 A * | 10/1999 | Thor | ............... G06F 1/24 713/501 |
| 7,555,590 B2 * | 6/2009 | Elliot | ............... G06F 1/12 375/354 |
| 7,668,675 B2 * | 2/2010 | Takita | ............... H03K 5/19 702/78 |

(Continued)

FOREIGN PATENT DOCUMENTS

| CN | 101086722 | 12/2007 |
| CN | 102404211 | 4/2012 |

(Continued)

OTHER PUBLICATIONS

"International Application No. PCT/CN2015/091589, International Search Report dated Jan. 7, 2016", (dated Jan. 7, 2016), 11 pgs.

(Continued)

*Primary Examiner* — Kim Huynh
*Assistant Examiner* — Paul J Yen
(74) *Attorney, Agent, or Firm* — Schwegman Lundberg & Woessner, P.A.

(57) ABSTRACT

A processing system with multiple processors is switchable between two modes of operation dynamically: symmetrical multi-processing (SMP) and asymmetrical multi-processing (ASMP). The system uses certain criteria to determine when to switch to improve the power consumption or performance. A controller enables control and fast-switching between the two modes. Upon receipt of a switching command to switch between SMP and ASMP, a series or sequence of actions are performed to control voltage supplies and CPU/memory clocks to the multiple processors and cache memory.

21 Claims, 12 Drawing Sheets

(56) References Cited

U.S. PATENT DOCUMENTS

| | | | |
|---|---|---|---|
| 8,283,902 | B1 | 10/2012 | Kahn et al. |
| 8,862,926 | B2 * | 10/2014 | de Cesare .................. G06F 1/10 |
| | | | 713/500 |
| 2005/0138444 | A1 | 6/2005 | Gaskins |
| 2006/0129585 | A1 | 6/2006 | Ishiki et al. |
| 2007/0049133 | A1 * | 3/2007 | Conroy ..................... G06F 1/26 |
| | | | 439/894 |
| 2007/0136617 | A1 | 6/2007 | Kanno et al. |
| 2007/0139085 | A1 | 6/2007 | Elliot et al. |
| 2007/0156370 | A1 | 7/2007 | White et al. |
| 2007/0283128 | A1 | 12/2007 | Hoshaku |
| 2008/0046770 | A1 | 2/2008 | Jong et al. |
| 2009/0235108 | A1 | 9/2009 | Gold et al. |
| 2010/0073068 | A1 | 3/2010 | Cho et al. |
| 2011/0283124 | A1 * | 11/2011 | Branover .............. G06F 1/3203 |
| | | | 713/323 |
| 2012/0005535 | A1 | 1/2012 | Shigehara |
| 2012/0060170 | A1 | 3/2012 | Vajda |
| 2012/0079290 | A1 | 3/2012 | Kumar et al. |
| 2012/0131356 | A1 | 5/2012 | Han |
| 2012/0198207 | A1 | 8/2012 | George et al. |
| 2013/0060555 | A1 | 3/2013 | Thomson et al. |
| 2013/0111143 | A1 | 5/2013 | Kurihara et al. |
| 2013/0185570 | A1 | 7/2013 | Kumar et al. |
| 2014/0139197 | A1 | 5/2014 | Price et al. |
| 2014/0181556 | A1 | 6/2014 | Eckert et al. |
| 2014/0359311 | A1 | 12/2014 | Jahagirdar et al. |
| 2015/0124546 | A1 | 5/2015 | Son et al. |
| 2016/0004292 | A1 | 1/2016 | Sharda et al. |
| 2016/0109922 | A1 | 4/2016 | Chen et al. |
| 2016/0109923 | A1 | 4/2016 | Chen et al. |

FOREIGN PATENT DOCUMENTS

| | | |
|---|---|---|
| CN | 102609075 | 7/2012 |
| CN | 102637134 | 8/2012 |
| EP | 1736851 | 12/2006 |

OTHER PUBLICATIONS

"International Application No. PCT/CN2015/091655, International Search Report dated Jan. 8, 2016", (dated Jan. 8, 2016), 12 pgs.

"International Application No. PCT/CN2015/091664, International Search Report dated Jan. 12, 2016", (dated Jan. 12, 2016), 11 pgs.

"International Application No. PCT/CN2015/091589, Written Opinion dated Jan. 7, 2016", 4 pgs.

"International Application No. PCT/CN2015/091655, Written Opinion dated Jan. 8, 2016", 5 pgs.

"International Application No. PCT/CN2015/091664, Wiltten Opinion dated Jan. 12, 2016", 4 pgs.

"U.S. Appl. No. 14/580,044, Restriction Requirement dated Apr. 6, 2017", 7 pgs.

"U.S. Appl. No. 14/704,240, Non Final Office Action dated Dec. 13, 2016", 10 pgs.

"U.S. Appl. No. 14/704,240, Response filed Mar. 13, 2017 to Non Final Office Action dated Dec. 13, 2016", 11 pgs.

"U.S. Appl. No. 14/704,240, Response filed Aug. 16, 2017 to Non Final Office Action dated Jun. 23, 2017", 15 pgs.

"European Application No. 15851575.9, Extended European Search Report dated Aug. 10, 2017", (dated Aug. 10, 2017), 21 pgs.

"U.S. Appl. No. 14/580,044, Response filed May 26, 2017 to Restriction Requirement dated Apr. 6, 2017", 17 pgs.

"U.S. Appl. No. 14/704,240, Non Final Office Action dated Jun. 23, 2017", 28 pgs.

"European Application No. 15850559.4, Extended European Search Report dated Sep. 13, 2017", (dated Sep. 13, 2017), 12 pgs.

"European Application No. 15850680.8, Extended European Search Report dated Aug. 21, 2017", (dated Aug. 21, 2017), 23 pgs.

U.S. Appl. No. 14/580,044, filed Dec. 22, 2014, Novel Low Cost, Low Power High Performance SMP/ASMP Multiple-Processor System.

U.S. Appl. No. 14/704,240, filed May 5, 2015, Fast SMP/ASMP Mode-Switching Hardware Apparatus for a Low-Cost Low-Power High Performance Multiple Processor System.

* cited by examiner

HARDWARE APPARATUS AND METHOD FOR MULTIPLE PROCESSORS DYNAMIC ASYMMETRIC AND SYMMETRIC MODE SWITCHING

TECHNICAL FIELD

The present invention relates generally to multiple processor architectures and systems, and more particularly, to an apparatus and method for switching between asymmetric and symmetric multi-processing modes.

BACKGROUND

Multi-processing systems utilize multiple processors (e.g., central processing units (CPU)) to process data and perform desired functions. As will be appreciated, the term "processor" is used synonymously with the terms "CPU" or "core" and is readily understood by those skilled in the art. In the prior art, there exist two main types of disparate multi-processing systems: Symmetric multi-processing (SMP) and asymmetric multi-processing (ASMP).

SMP systems are typically characterized by the sharing of all system resources, a single synchronous L2 cache interface (and possibly asynchronous L2), processors are controlled at the same clock frequency and clock voltage. This also general means the processors/cores are equally accessible to the shared memory system (such as L2 cache and memory). In SMP, clock frequencies and voltages are not individually adjustable and, therefore, cannot be changed on a per core/processor basis. In addition, the L2 cache is shared among all cores and the L2 cache frequency is not scalable on a per core basis. In most, if not all applications, workloads of the processors in SMP are unbalanced and this leads to higher power consumption.

In contrast, ASMP systems are typically characterized by having different clock frequencies and/or clock voltages individually for processors and the L2 cache clock frequency can be independently scaled. Thus, processor clock frequency and L2 cache frequency can be scaled based on workload (e.g., faster L2 cache relative to cores for memory intensive workloads). In general terms, ASMP systems are more power efficient than SMP systems, but potentially higher power consumption may be caused by the additional and more complex hardware. When the L1 cache miss rate is high, the processor will fetch date from the L2 cache. If the requested relevant data is stored in the lower clock frequency portion of the L2 cache, the processor has to wait for the data. This leads to higher latency and higher power consumption.

Turning to FIG. 1, there is illustrated the basic architecture of a processing system 100 having multiple processors employing ASMP. As will be appreciated, a similar prior art system is utilized for SMP, however, the processors operate at a single clock frequency and using a single supply voltage level—as readily understood by persons of ordinary skill in the art.

The processing system 100 includes a multi-processor cores and caches subsystem 105 having multiple processors 110 (110a, 110b, 110c, 110d) with corresponding L2 cache memory portions 120 (120a, 120b, 120c, 120d) and clock domain crossing (CDC) circuits 130 (130a, 130b, 130c, 130d), as illustrated. Though four processors 110 (and corresponding memory and circuitry) are shown, the number of processors could be fewer or greater, but will include at least two. As will be appreciated, each processor 110 may include one or more central processing units (CPUs).

The processing system 100 further includes a power management control (PMIC) circuit 140 for generating multiple supply voltage signals for use in supplying power to the respective processors, caches and CDCs. Similarly, a clock generation circuit 150 generates multiple clock signals having various predetermined clock frequencies for use in clocking operation of the respective processors, caches and CDCs. As will be appreciated, the PMIC circuit may be on the same substrate as the subsystem 105 or may be provisioned on another substrate (e.g., in another IC).

As noted above and readily understood by those skilled in the art, each of the distinct SMP and ASMP architectures/systems have various advantages or benefits, as well as various disadvantages or drawbacks. Due to the complexity and costs for each type of system (both in hardware and software functionality), a designer typically must choose either the SMP system or the ASMP system based on the particular application(s).

Accordingly, there is needed a multiprocessing system or architecture that can operate and provide the functionality of both an SMP system and an ASMP system without having duplicate multi-processor cores, caches and CDC subsystems. There is also needed a method for control and selection of either the SMP or ASMP mode to reduce power consumption and increase efficiency.

SUMMARY

According to one embodiment, a multi-processing system includes a plurality of processors, each processor configured to receive a clock signal having a predetermined frequency and receive a supply voltage having a predetermined operating voltage. A controller coupled to the plurality of processors is configured to switch operation of the plurality of processors between a first mode of operation and a second mode of operation: when in the first mode of operation, the plurality of processors perform symmetric multi-processing and, when in the second mode of operation, the plurality of processors perform asymmetric multi-processing.

According to another embodiment, there is provides an apparatus having a plurality of processors configured to perform multiprocessing functions; a controller configured to control operation of the plurality of processors in a first mode and a second mode; a clock generation circuit coupled to the controller and configured to generate and output a plurality of clock signals; and a processor operating voltage generation circuit coupled to the controller and configured to generate and output a plurality of processor operating supply voltage signals. A switching circuit is disposed between the clock generation circuit and the plurality of processors and configured to receive the plurality of clock signals and output a second plurality of clock signals to the plurality of processors, wherein during the first mode of operation, the second plurality of clock signals each have a same predetermined frequency, and during the second mode of operation, the second plurality of clock signals each have a different predetermined frequency. Cache memory is also coupled to and configured for use with the plurality of processors. The apparatus further includes a clock-domain crossing (CDC) and bypass circuit responsive to the controller and coupled to the plurality of processors and the cache memory, and further configured to provide a clock-domain crossing function between the plurality of processors and the cache memory during the second mode of operation and provide a bypassing function during the first mode of operation.

In another embodiment, there is provided a method for switching a processing system having a plurality of processors between a symmetric multiprocessing (SMP) mode and an asymmetric multiprocessing (ASMP) mode. The method includes receiving an instruction to switch between the SMP mode and the ASMP mode and switching the mode of operation of the processing system in accordance with the received instruction. Switching the mode of operation includes: when the processing system is currently operating in the SMP mode, generating a plurality of ASMP clock signals each having a different ASMP predetermined frequency, and inputting each of the plurality of ASMP clock signals to a different processor of the plurality of processors for operation of the respective processor at the respective ASMP predetermined frequency, and when the processing system is currently operating in the ASMP mode, generating an SMP clock signal having an SMP predetermined frequency, and inputting the SMP clock signal to each processor of the plurality of processors for operation of each processor at the SMP predetermined frequency.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 7, discussed herein, and the various embodiments used to describe the principles of the present disclosure in this patent document are by way of illustration only and should not be construed in any way to limit the scope of the invention. Those skilled in the art will understand that the principles described herein may be implemented in any type of suitably arranged device(s) or system(s).

In general terms, the present application describes a processing system with multiple processors that is switchable between two modes of operation: symmetrical multi-processing (SMP) and asymmetrical multi-processing (ASMP). The system includes a hardware apparatus that enables control and switching between the two modes. Within the hardware, upon receipt of a switching command from the operating system (OS) or other software/hardware, to switch between SMP and ASMP, a series or sequence of action is performed to control clocks and voltages to the multiple processors and memory. The generation of the switching command can be based on one or more factors, as desired, such as loading, cache miss rate, power consumption reasons, etc. The apparatus ensures that the system does not fail during the transition from one mode to the other and clocks to the processors/memory are switched glitchlessly. The apparatus/method minimizes software/OS intervention and has faster mode-switch speed.

As used herein, the term SMP generally refers to processing using multiple processors/CPUs/cores operating at with a same clock (frequency) and same voltage supply utilizing a shared memory system (with L2 cache memory operating with the same clock and voltage supply). The term ASMP generally refers to processing using multiple processors/CPUs/cores with at least two operating with different clock (frequency) and/or voltage supply. In ASMP, typically the processors each utilize different L2 cache memory. However, ASMP may also include sharing of the same L2 cache memory (referred to as heterogeneous ASMP).

The present application further describes various methods for mode switching (dynamic/static or manual/intelligent) between the SMP and ASMP modes of operation (e.g., generation of the switching command). In one method, SMP mode is selected under light load conditions or when L1 cache miss rate is high. ASMP is selected under heavy and unbalanced load conditions. Also, a learning mode is introduced which can be used facilitate fast mode selection in real time. The overall benefits can include lower power when loads are unbalanced, better performance with fewer cache misses, and the ability to manually or intelligently switch modes.

Figure 1:
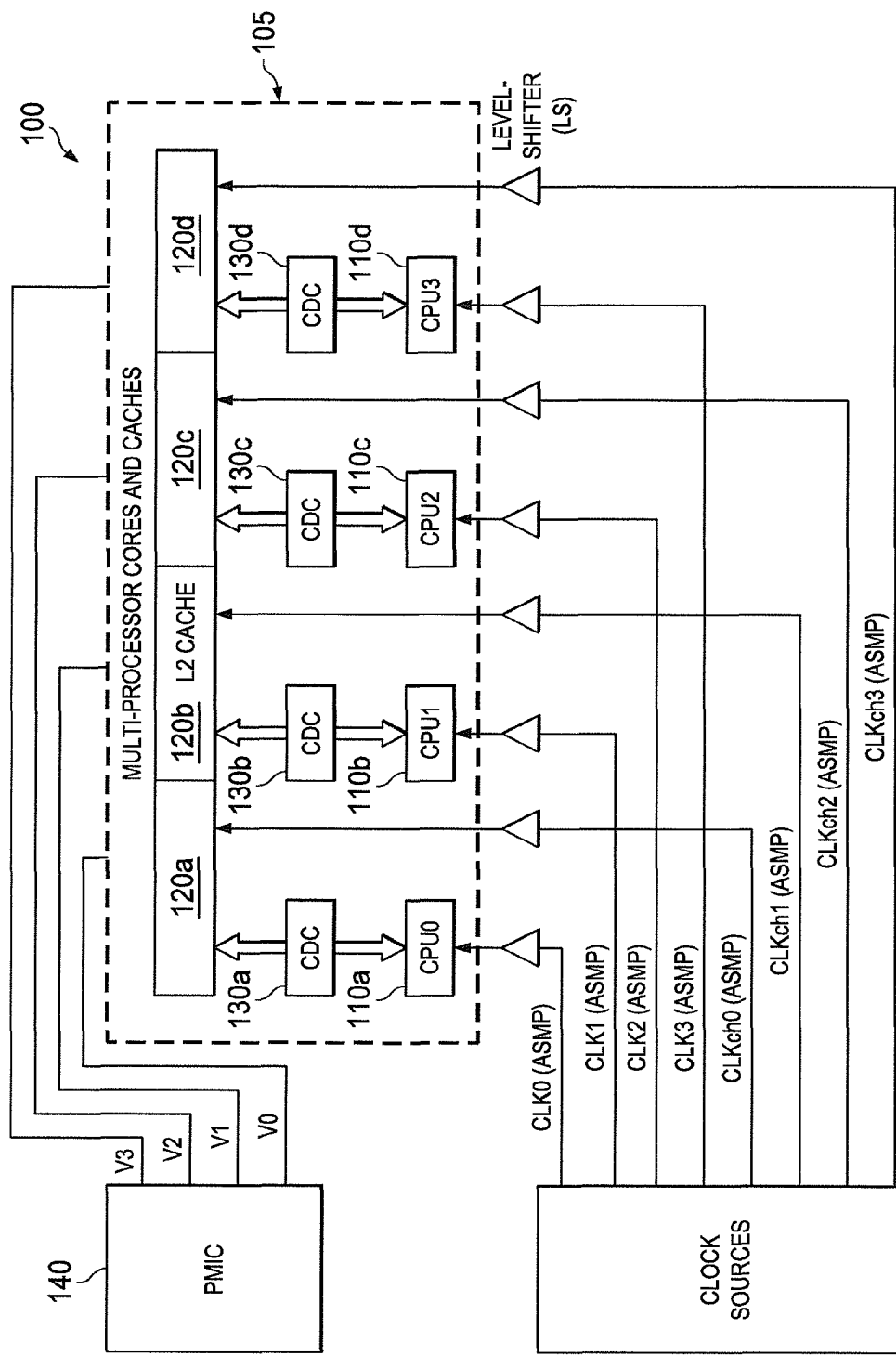
FIG. 1 illustrates an example prior art asymmetric multiprocessing system (ASMP)
Figure 2:
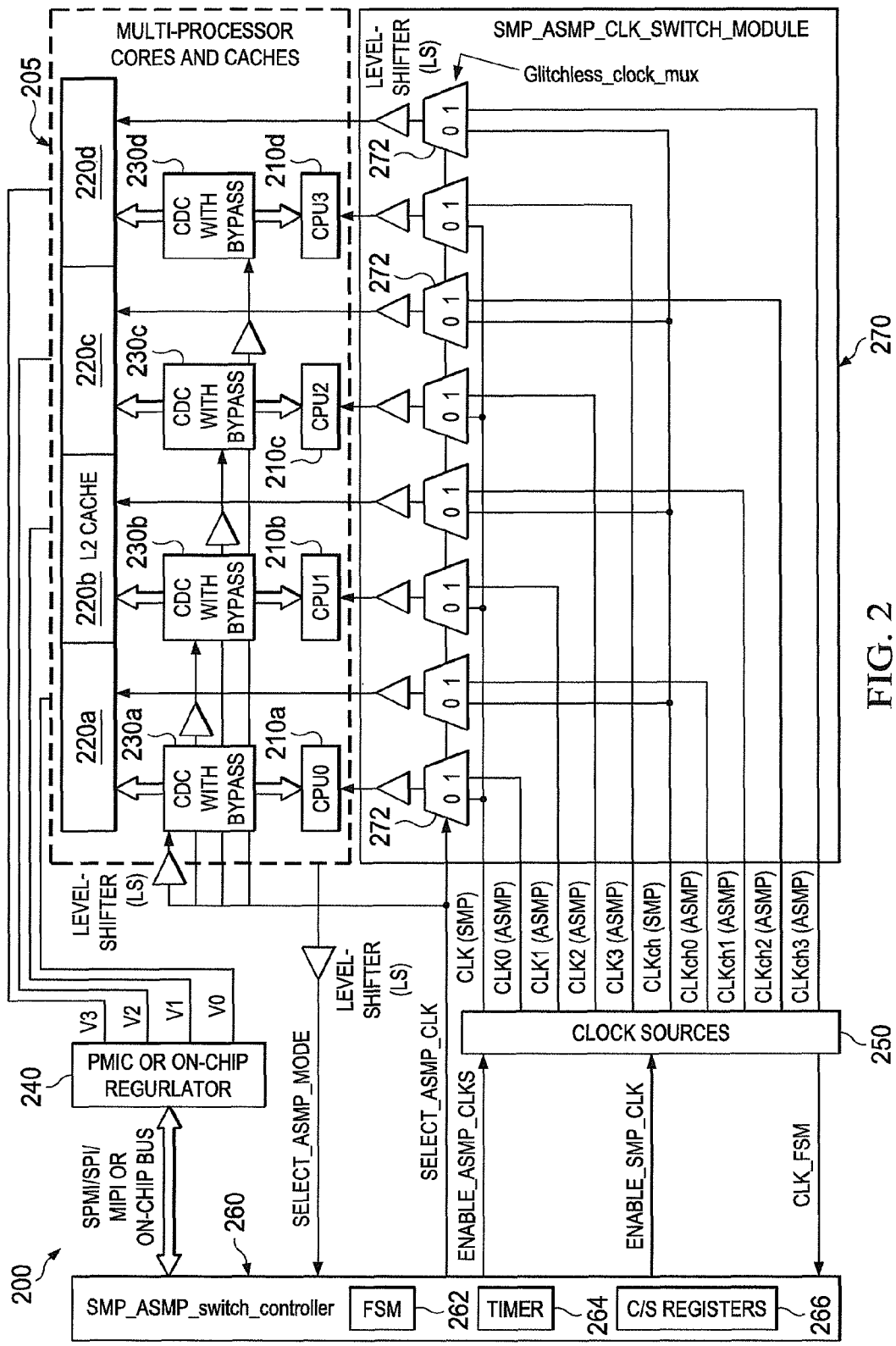
FIG. 2 is a diagram illustrating an example multiprocessing system according to certain embodiments of the present disclosure.

Now turning to FIG. 2, there is shown a detailed diagram illustrating a processing system 200 in accordance with the present disclosure. The processing system 200 includes a multi-processor cores and caches subsystem 205 having multiple processors 210 (210a, 210b, 210c, 210d) with corresponding L2 cache memory portions 220 (220a, 220b, 220c, 220d) and cross-domain clock (CDC) with bypass circuits 230 (230a, 230b, 230c, 230d), as illustrated. While four processors 210 (and corresponding memory and circuitry) are shown, the number of processors could be fewer or greater, but will include at least two. As will be appreciated, each processor 210 may include one or more central processing units (CPUs).

The processing system 200 further includes a power management control (PMIC) circuit 240 for generating multiple supply voltage signals for use in supplying power to the respective processors, caches and CDCs. Similarly, a clock generation circuit 250 generates multiple clock signals having various predetermined clock frequencies for use in clocking operation of the respective processors, caches and CDCs. It will be understood that the PMIC circuit 240 may be disposed or otherwise located on the same substrate (e.g., in the same chip/die) as the subsystem 205 or may be provisioned on another substrate (e.g., in another IC, chip, die and/or package) or otherwise external to the processors 210.

As illustrated, the processing system 200 also includes a controller 260 (which may also be referred to as a mode controller) and a clock switching circuit (or module) 270. As will be understood, the controller 260 outputs various control signals for controlling the functionality and operation of the clock generation circuit 250, the PMIC circuit 240, the "CDC with bypass circuits" 230 and the clock switching circuit 270.

The clock generation circuit 250 includes the necessary circuitry and elements for generating multiple clock signals, including one SMP processor clock signal (CLK) for controlling operational speed of all of the processors 210 collectively, one SMP memory clock signal (CLKch) for controlling operational speed of all of the cache portions 220 collectively, four ASMP processor clock signals (CLK0, CLK1, CLK2, CLK3) enabling independent control of the operational speed of each of the four processors (210a, 210b, 210c, 210d), and four ASMP memory clock signals (CLKch0, CLKch1, CLKch2, CLKch3) enabling independent control of the operational speed of each of the cache memory portions (220a, 220b, 220c, 220d). Any of these clocks are enabled or disabled glitchlessly by the circuit 250. The clock generation circuit 250 also generates a controller clock signal (CLK_FSM) for use by the controller 260.

The PMIC circuit 240 includes the necessary circuitry and elements for generating multiple operating supply voltages or signals for use by respective portions of the subsystem 205. As illustrated, the PMIC circuit 240 generates and outputs four operating supply voltages (V0, V1, V2, V3) that supply power to each respective group of processing units. In other words, operating supply voltage V0 supplies power to the processor 210a, the cache memory portion 220a and the CDC with bypass circuit 230a, while voltage supply V1 supplies power to the processor 210b, the cache memory portion 220b and the CDC with bypass circuit 230b, etc. As understood by those skilled in the art, when a processor/memory operates at a higher clock speed, it is desirable and may be necessary to also operate the processor/memory with a higher supply voltage. In addition, when a core is not used, it can be power collapsed or clock-disabled.

In will be understood that the clock generation circuit 250 may also include functionality and circuitry enabling programmability to each of the generated clock signals. In one embodiment, each of the clock signals may be programmable to one of many possible frequencies (e.g., the CLK may be programmable between a range such as 300 Mhz to 3 GHz). In another embodiment, only certain clock signals may be programmable, while in other embodiments, the frequency of each clock signal is predetermined and fixed. In yet another embodiment, the frequencies may be fixed relative to each other, but may be programmable as a group.

Similarly, the PMIC circuit 240 may also include functionality and circuitry to provide programmability to each of the generated operating voltage supplies V0, V1, V2, V3. In one embodiment, each supply may be programmable to one of many possible voltage levels (e.g., the voltage may be programmable between a range such as 0.5 volts and 3.3 volts). In another embodiment, only certain voltage power supplies may be programmable, while in other embodiments, the voltage level of each supply is predetermined and fixed. In yet another embodiment, the voltage levels may be fixed relative to each other, but may be programmable as a group. Though not shown, in another embodiment, a base operating voltage supply may be generated in addition to the four shown. In this case, the base voltage supply and the other four could be used as inputs to multiplexing circuitry (similar to the multiplexers 272 shown in the clock switching circuit 270).

In another embodiment (not shown), one or more of the respective processor/L2 cache memory pairs may have different power supply voltage signals—a "split-rail" system. In such a system, the L2 cache memory and its associated processor have different voltage supply rails. As will be appreciated, one or more (or all) of the pairs may have a split rail voltage supply. Therefore, in this embodiment, the generated operating voltage supplies V0, V1, V2, V3 may be split and include separate supplies V0 (processor) and V0 (cache), and so on, etc. These may be programmable independently or as one or more groups. In this embodiment, the system 200 may further include voltage-domain crossing circuits (not shown) separate from, or included within, the CDC circuits 230.

The mode or switch controller 260 includes a finite state machine (FSM) 262, one or more timers 264, and one or more storage registers 266 (such as configuration or status registers). The controller 260 functions to control and perform a sequence of actions or processes in response to assertion of a switch command (SELECT_ASMP_MODE). Therefore, in the illustrated embodiment, when the switch command is asserted/unasserted, the mode of operation is switched between the ASMP mode and the SMP mode. Various methods and mechanisms may be used for generation of the switch command, and some examples are described below with respect to FIGS. 8-11.

Using enable signals (ENABLE_ASMP_CLKS, ENABLE_SMP_CLK), the controller 260 controls the clock generation module 250 to enable the clocks prior to SMP/ASMP switching. The controller 260 also controls the PMIC circuit 240 module to program or change the operating supply voltages V0, V1, V2, V3 prior to switching (and after switching). In one embodiment, the controller 260 may communicate with the PMIC circuit 240 over a communication bus or interface, such as a SPMI/SBI/MIPI, if the PMIC circuit 240 is external to the processors (e.g., off-chip). If the PMIC circuit is not external, other communication path(s) may be utilized.

It will be understood that the switch command (SELECT_ASMP_MODE) may be generated in response to various events and by various elements within or external to the processing system 200. In the embodiment shown, the switch command is generated from the multi-processor cores and caches subsystem 205, but other it may be generate by other sources.

When actual switch over from the SMP clock to the ASMP clocks (and vice versa) occurs, the controller 260 generates an ASMP select signal (SELECT_ASMP_CLK) that selectively multiplexes the ASMP clock signals to the processors using multiplexers 272 within the clock switching circuit 270. As understood, the clocks for the processor/CPU cores 210 in the ASMP mode are denoted as CLK0, CLK1, CLK2, CLK3 while the clock for the processor/CPU cores 210 in the SMP mode is denoted CLK. Thus, the SELECT_ASMP_CLK signal selects which clocks to use glitchlessly. In one embodiment, when SELECT_ASMP_CLK is asserted (logic high or "1"), the clock signals CLK0, CLK1, CLK2, CLK3 are selected and input to the processors/cores 210a, 210b, 210c and 210d, respectively. When SELECT_ASMP_CLK is unasserted (logic low or "0"), the clock CLK is selected and input to all of the processors/cores 210a, 210b, 210c and 210d. The timing of various events and actions during the switching is controlled by in accordance with the FSM 262 with use of the one or more timers 264. As will be described in more detail below, a clock warm-up period and a voltage ramp up/ramp down period are utilized. These values can be pre-programmed or pre-set and stored in the C/S registers or other memory locations (none shown) in the controller by software or other methods.

As will be appreciated, and though not specifically identified with reference numerals, various other logic circuits can be included, such as for example, level shifters. Level shifters are typically utilized when a signal crosses power domains.

Figure 3A:
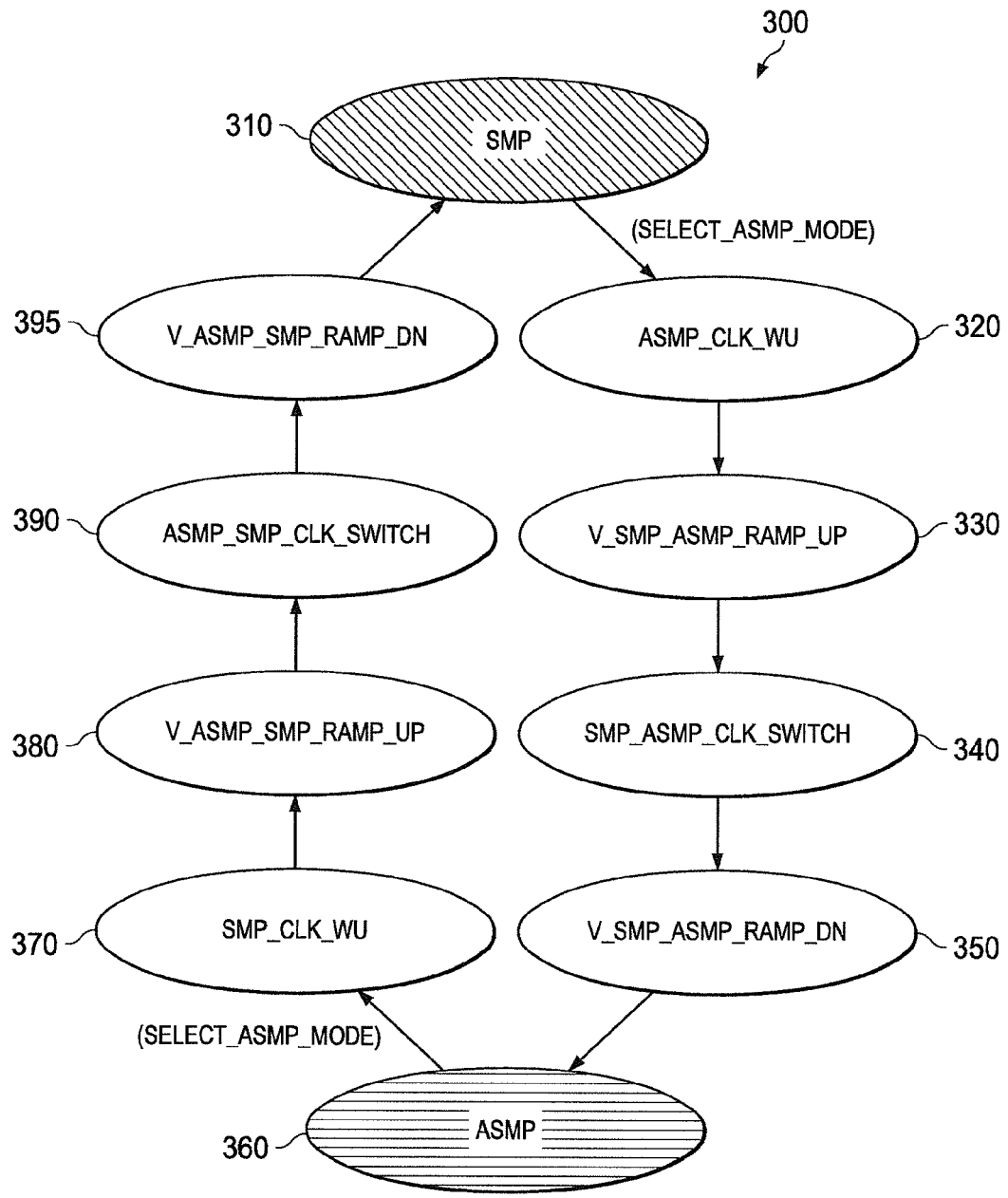
FIGS. 3A, 3B and 3C illustrate an example finite state machine (FSM) and process for use with the system shown in FIG. 2 according to the present disclosure.
Figure 3B:
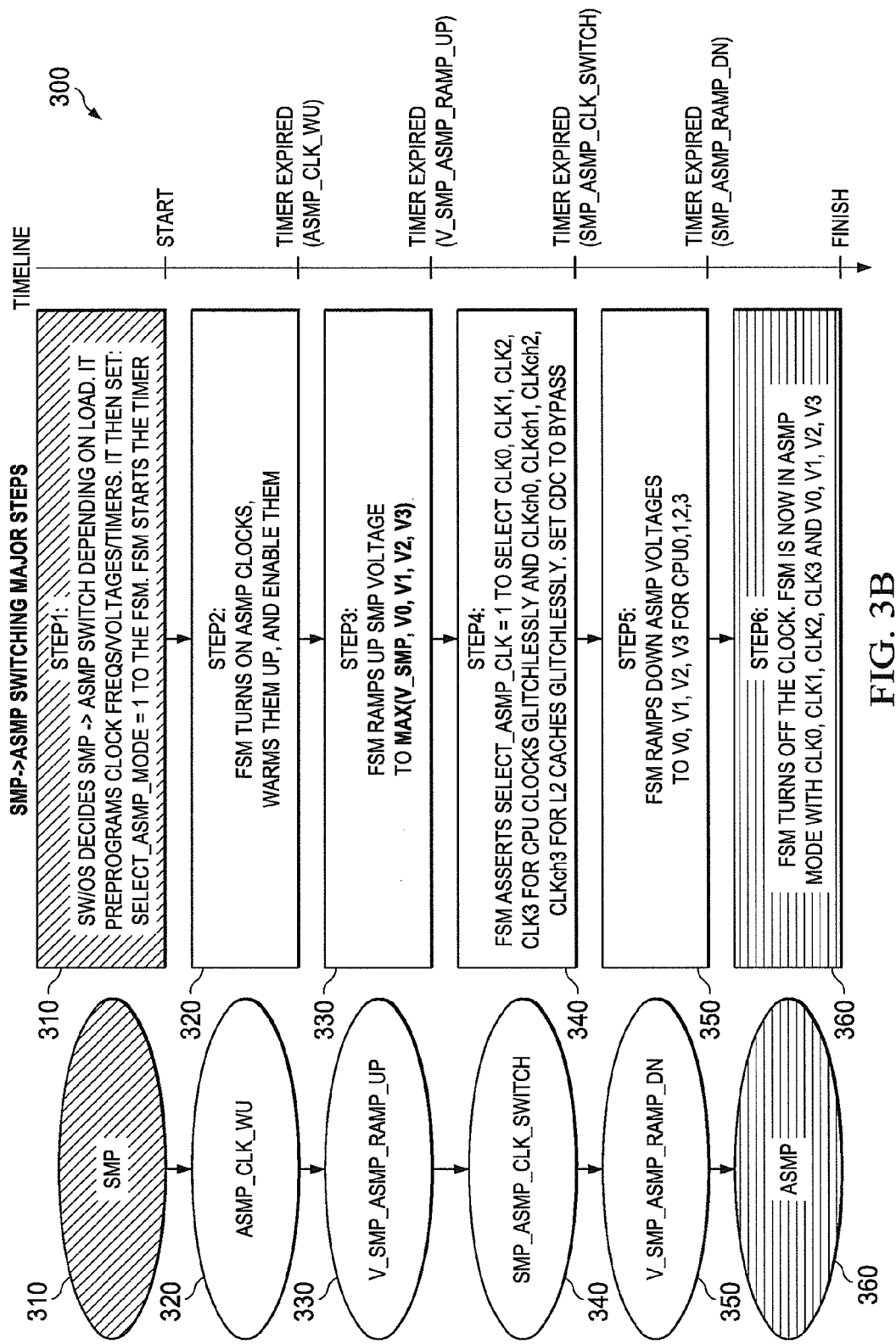
Figure 3C:
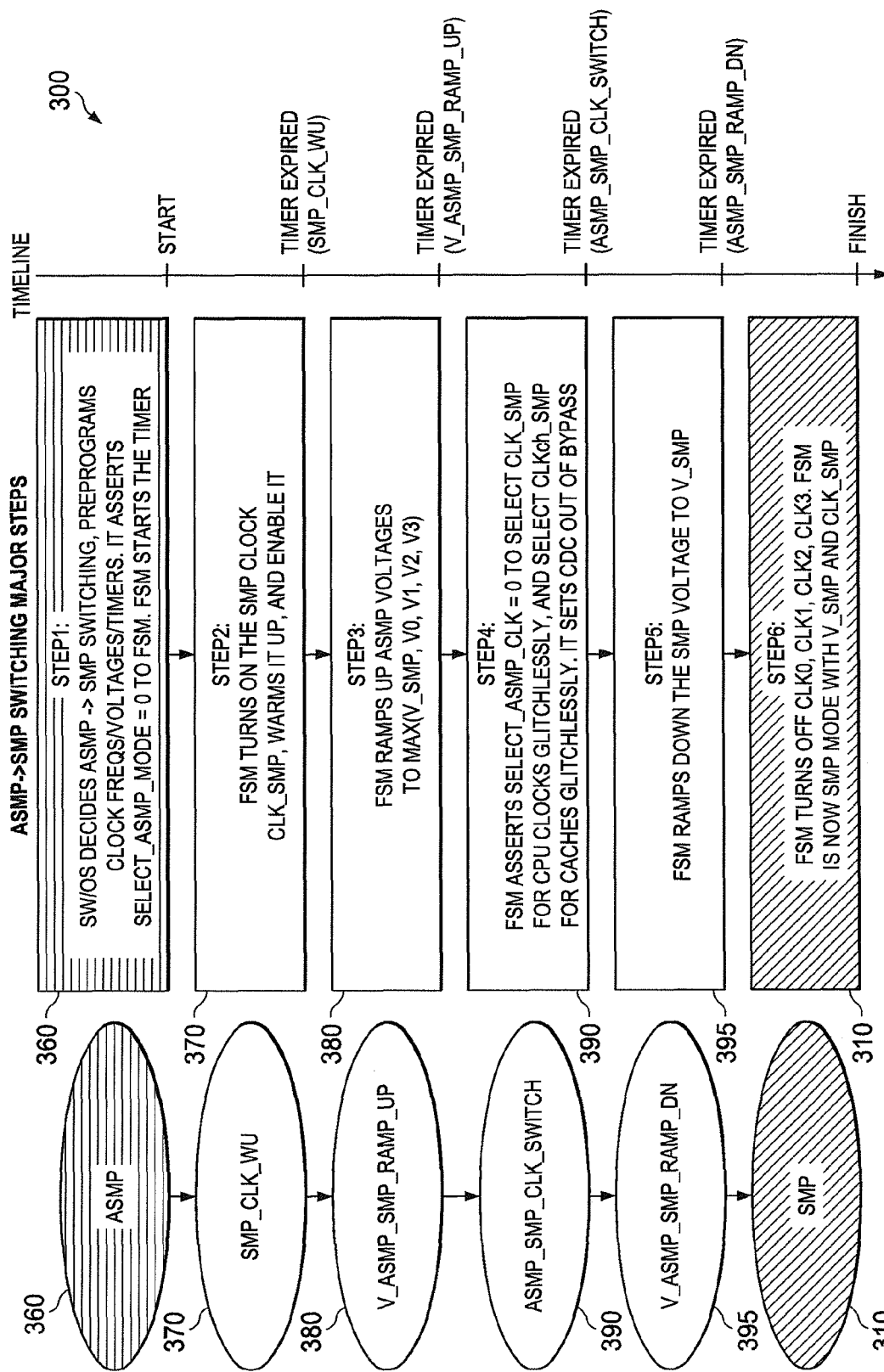

Now turning to FIGS. 3A, 3B and 3C, there is illustrated a process or method 300 performed or implemented by the FSM 262. As will be appreciated, this process/functionality of the FSM 262 may be implemented using different configurations, methods or structures (or combinations thereof) or methods. For example, although implemented in the illustrated embodiment as a finite state machine (e.g., hardware implementation), the controller 206 functionality may alternatively be implemented using software, a microcontroller with firmware, etc., and any combination thereof, or in any other manner/way known to those skilled in the art. The FSM 262 advantageously operates at a faster speed and minimizes software/OS intervention. In the event of exceptions, e.g., timeout, etc., it will generate an interrupt to the system processor.

As shown in FIGS. 3A, 3B and 3C, the process 300 represented by the state diagram of the FSM 262 includes various states and transitions. In a state 310, the processing system 200 is operating in the SMP mode. When a switching command (SELECT_ASMP_MODE) is received, a state 320 (ASMP_CLK_WU) is entered in which the ASMP clocks are enabled and activated (using the ASMP clock enable signal) and "warmed up". After completion of a predetermined warm-up time period (timer), a state 330 (V_SMP_ASMP_RAMP_UP) is entered in which the all of the operating voltage supplies V, V0, V1, V2, V3 are increased (if necessary) to a predetermined maximum voltage level (MAX). The predetermined maximum voltage level is equal (or greater than) the highest voltage level that V1, V2, V3, V4 will have during operation of the processing system 200 in the ASMP mode. For example, if the four processors are currently operating at 1.5 volts (in the SMP mode), and in the ASMP mode, the four processors will operate at 1.2, 1.9, 1.7 and 1.7 volts, respectively, then all of the operating supply voltages V1, V2, V3 and V4 are increase to 1.9 volts (or more).

After these four operating voltage supply voltages reach the predetermined maximum voltage (MAX), then a state 340 (SMP_ASMP_CLK_SWITCH) is entered. In this state 340, the clock switching signal is asserted and the clocks (all equal to the frequency of CLK SMP) of the processors 210 and memory 220 are switch from the SMP clock signal to the ASMP clock signals. As shown, the multiplexers 272 are switched to output the respective ASMP clock signals CLK1, CLK2, CLK3, CLK4 instead of the SMP clock signal CLK. At this same time, the CDC with bypass circuits 230 are also set to a bypass mode enabling the ASMP clock signals to bypass the clock domain circuitry in the CDC with bypass circuits 230. Also, at this time, the SMP clock signal generated by the clock generation circuit 250 may be deactivated.

After these events are completed, a state 350 (V_SMP_ASMP_RAMP_DN) is entered which triggers a ramp down procedure for operating supply voltages V1, V2, V3, V4. Because all the processors 210 (and memory 220) are operating at the MAX operating supply voltage (in the example above, 1.9 volts) and the desired operating supply voltages for V1, V2, V3 and V4 in ASMP mode are different (in the example above, 1.2, 1.9, 1.7 and 1.7 volts, respectively), the voltage levels of V1, V3 and V4 are reduced to voltage levels desired in the ASMP mode.

After the operating supply voltages are ramped-down (e.g., set to the desired voltage levels for each processor in the ASMP mode), a state 360 is entered. In this state, the processing system 200 is now operating in the ASMP mode with each of the respective processor/memory combinations, e.g., 210a/220a, 210b/220b, 210c/220c, and 210d/220d, operating in accordance with clock and voltage signal combinations CLK0/V0, CLK1/V1, CLK2/V2, CLK3/V3, respectively.

It will be understood that in different embodiments, one or more steps performed by the FSM 262 may be omitted or bypassed. For example, if all the voltages are the same, the V_SMP_ASMP_RAMP_UP and V_SMP_ASMP_RAMP_DN states may not be necessary and may be omitted. In this example, this would reduce any mode-switching latency. In some other embodiments, the clocks voltages must be ramped up before the clocks are switched.

As note previously, the clock voltage and frequency values may be predetermined by software/OS using the methods described herein and can be pre-stored or programmed into C/S registers (or other memory locations) in the controller prior to initiating switching. In another embodiment, the system may determine the clock voltage and/or frequency values (from one of several possible values) during operation based on real-time operating characteristics or parameters. These values (or an identifier of these values) may then be stored in the C/S register (or some other memory locations).

A similar process is followed when switching from the ASMP mode to the SMP mode. In the state 360, the processing system 200 is operating in the ASMP mode. When a switching command (SELECT_ASMP_MODE—unasserted) is received, a state 370 (SMP_CLK_WU) is entered in which the SMP clock (CLK) is enabled and activated (using the SMP clock enable signal) and "warmed up". After completion of a predetermined warm-up time period (timer), a state 380 (V_ASMP_SMP_RAMP_UP) is entered in which the all of the operating voltage supplies V0, V1, V2, V3 are increased (if necessary) to a predetermined maximum voltage level (MAX). The predetermined maximum voltage level is equal to (or greater than) the highest voltage level that V1, V2, V3, V4 are currently supplying in the ASMP mode (or to the desired SMP voltage level V_SMP if that level is higher than all of the levels of V1, V2, V3 and V4). For example, if the four processors are currently operating at 1.2, 1.9, 1.7 and 1.7 volts (in the ASMP mode), and in the SMP mode, the four processors will operate at 1.5 volts (V_SMP), respectively, then all of the operating supply voltages V1, V2, V3 and V4 are increase to 1.9 volts (or more).

After these four operating voltage supply voltages reach the predetermined maximum voltage (MAX), then a state 30 (ASMP_SMP_CLK_SWITCH) is entered. In this state 390, the clock switching signal is asserted and the clocks (all possibly different from the frequency of the SMP clock signal CLK) of the processors 210 and memory 220 are switched from the ASMP clock signals CLK0, CLK1, CLK2, CLK3 to the SMP clock signal CLK. As shown, the multiplexers 272 are switched to output the SMP clock signal (CLK) instead of the ASMP clock signals. At this same time, the CDC with bypass circuits 230 are also set to operate using the clock domain circuitry (and disable the bypass mode) enabling the SMP clock signal to proceed through the clock domain circuitry in the CDC with bypass circuits 230. Also, at this time, the ASMP clock signals generated by the clock generation circuit 250 may be deactivated.

After these events are completed, a state 395 (V_ASMP_SMP_RAMP_DN) is entered which triggers a ramp down procedure for operating supply voltages V1, V2, V3, V4. Because all the processors 210 (and memory 220) are operating at the MAX operating supply voltage (in the example above, 1.9 volts) and the desired operating supply voltage is V_SMP in the SMP mode (in the example above, 1.5 volts) which is lower than the current voltage levels (1.9 volts in the example), all of the operating supply voltages V1, V2, V3 and V4 are reduced to the V_SMP level in the desired SMP mode (1.5 volts).

After the operating supply voltages are ramped-down (e.g., set to the desired SMP voltage level for each processor in the SMP mode), the state 310 is entered. In this state, the processing system 200 is now operating in the SMP mode with each of the respective processor/memory combinations, e.g., 210a/220a, 210b/220b, 210c/220c, and 210d/220d, operating in accordance with a single clock and voltage signal combination CLK/V_SMP.

It will be understood that in different embodiments, one or more steps performed by the FSM 262 may be omitted or bypassed. For example, if all the voltages are the same, the V_ASMP_SMP_RAMP_UP and V_ASMP_SMP_RAMP_DN states may not be necessary and may be omitted. In this example, this would reduce any mode-switching latency. In some other embodiments, the clocks voltages must be ramped up before the clocks are switched.

Figure 4:
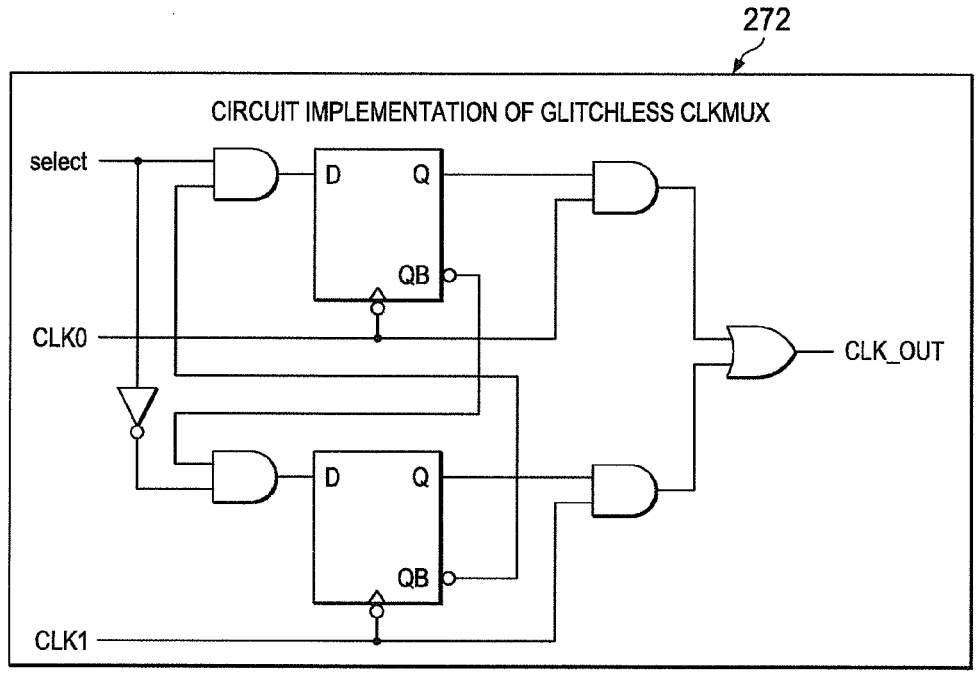
FIG. 4 is a diagram illustrating one implementation of a glitchless clock in accordance with the present disclosure.

Now turning to FIG. 4, there is shown one circuit implementation of the clock multiplexer 272 (shown in FIG. 2). In this embodiment, the clock multiplexers 272 are "glitchless" which means there is no glitch during switching. Other suitable circuit implementations may be utilized for the clock multiplexers 272, and those of ordinary skill in the art will readily understand other circuits can be used that perform glitchless multiplexer switching.

Figure 5:
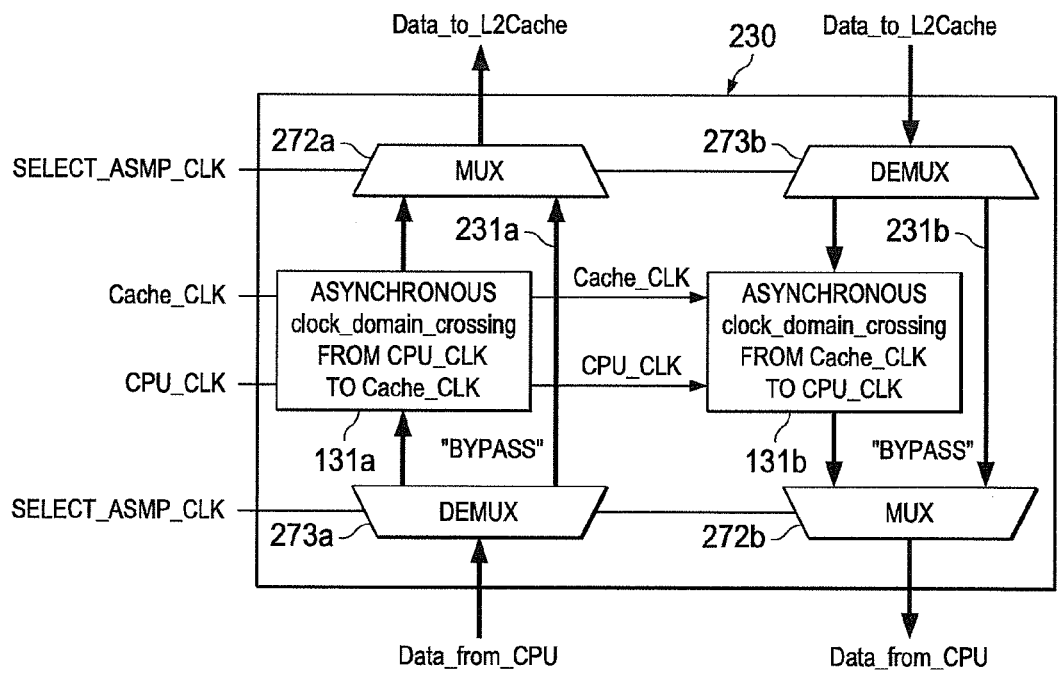
FIG. 5 is a block diagram of a clock domain crossing (CDC) and bypass circuit in accordance with the present disclosure.

Turning to FIG. 5, there is shown one implementation of the CDC with bypass circuits 230 (shown in FIG. 2). It will be understood that in the prior art ASMP system (See FIG. 1), the CDC circuits 130 each included two asynchronous clock domain crossing (CDC) circuits 131a, 131b disposed between the respective processors 210 and L2 cache portions 220. As will be appreciated, the asynchronous CDC circuits 131 are known in the art and, therefore, persons of ordinary skill the art will understand how to implement such functionality. These CDC circuits and/or their functionality may also be known in the art as clock-switching circuits, or as an asynchronous FIFO bridge between the processor and L2 cache.

The CDC with bypass circuits 230 further include a first multiplexer 272a, a first demultiplexer 273a, and a first BYPASS line 231a associated with the asynchronous CDC circuit 131a—as shown in FIG. 5. A second multiplexer 272b, a second demultiplexer 273b, and a second BYPASS line 231b are associated with the asynchronous CDC circuit 131b—as shown in FIG. 5. When switching between modes (e.g. between CDC asynchronous mode and synchronous bypass mode) in the CDC circuits 230, the CDC circuits 230 perform "glitchless" switching to ensure no failures due to potential glitches.

Persons of ordinary skill in the art will understand that in the SMP mode (the Select_ASMP_CLK signal is unasserted), data from the processor (e.g., 210a) bypasses the asynchronous CDC circuit 131a on its way to the L2 cache (e.g., 220a), while data from the L2 cache (e.g., 220a) bypasses the asynchronous CDC circuit 131b on its way to the processor (e.g., 210a). In contrast, when in the ASMP mode (the Select_ASMP_CLK signal is asserted and the Cache_CLK and CPU_CLK signals may be different), data from the processor (210a) will be processed by the asynchronous CDC circuit 131a on its way to the L2 cache (220a), while data from the L2 cache (220a) will be processed by the asynchronous CDC circuit 131b on its way to the processor (210a). The asynchronous CDC circuits 131a, 131b function to ensure data transfer from one clock domain to another clock domain according to a predefined sequence, e.g., the data received first is output first. The incoming data that is synchronous with the clock in one clock domain will be re-synchronized with the clock in another clock domain. An asynchronous FIFO generally provides the data buffer at the interface with some latency.

When in synchronous mode, the Cache_CLK will generally be derived from the CPU_CLK (e.g., divide-by-1 or divide-by-3) from the CPU_CLK. In other words, they may be equal and the CPU_CLK is usually an integer multiple of the Cache_CLK (e.g., CPU_CLK=3*Cache_CLK). The two clocks are synchronous in nature. Data generally crosses the interface synchronously with much less latency.

The multiplexers 272a, 272b can be the same as the glitchless clock multiplexer 272 illustrated in FIG. 4. The demultiplexers 273a, 273b may be similar in nature or circuitry to the multiplexers, but performing a demultiplexing function. In one preferred embodiment, these also are glitchless (perform glitchless switching).

Figure 6:
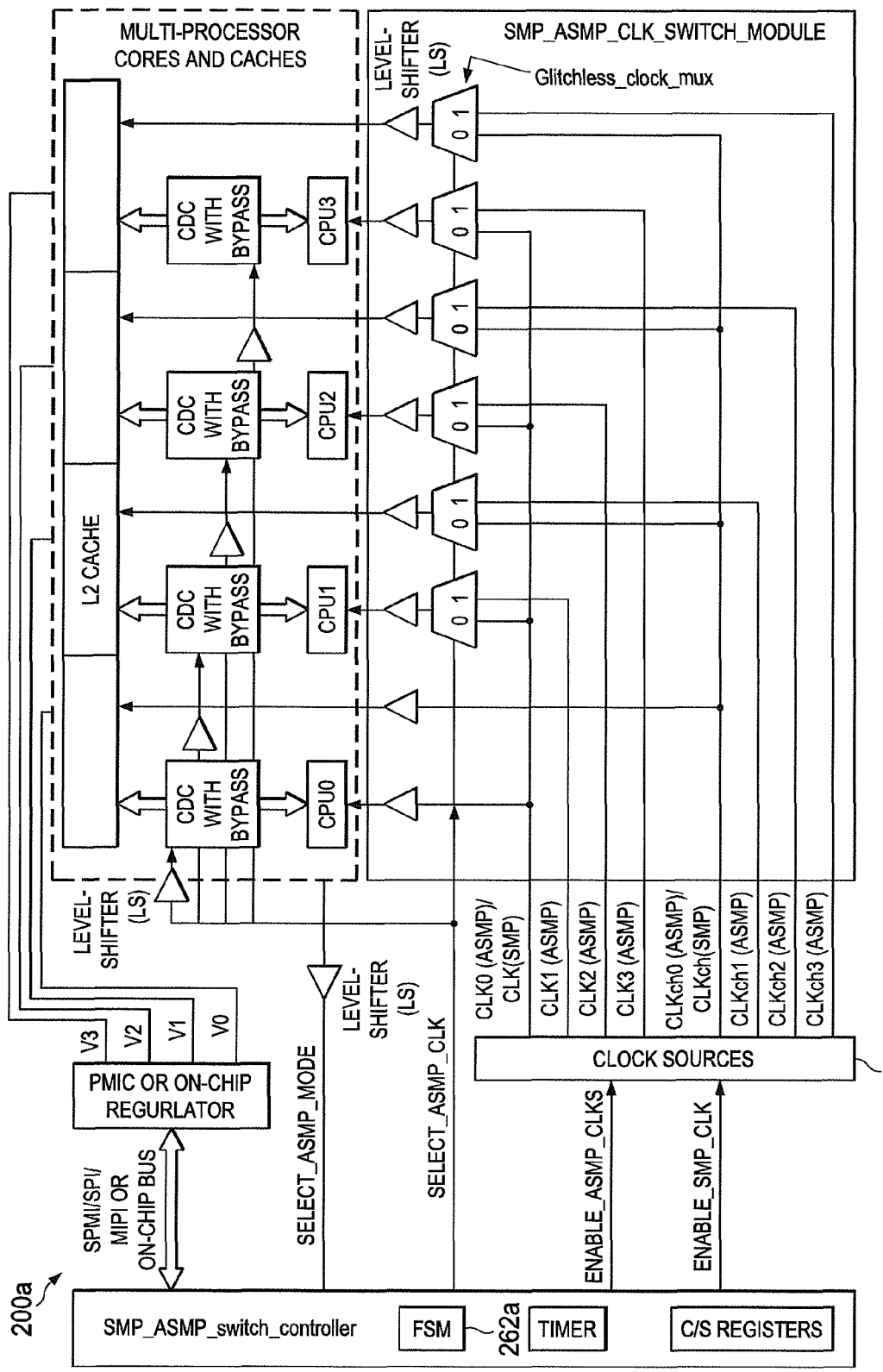
FIG. 6 is another embodiment of the example multiprocessing system shown in FIG. 2.

Now turning to FIG. 6, there is shown a detailed diagram illustrating another embodiment of a processing system 200a in accordance with the present disclosure. The processing system 200a is the same as the processing system 200 illustrated in FIG. 2, except (1) the CLK_0 signal functions as both the CLK_0 signal when in the ASMP mode and the CLK (SMP) signal when in the SMP mode, and (2) the CLK_ch0 signal functions as both the CLKch_0 signal when in the ASMP mode and the CLKch (SMP) signal when in the SMP mode. This eliminates the need for the first two multiplexers 272 associated with the processor/L2 cache pair (210a, 220a). In addition, a modified clock generation module 250a is provided to implement these clock signal differences, and a modified FSM 262a is also included.

Figure 6A:
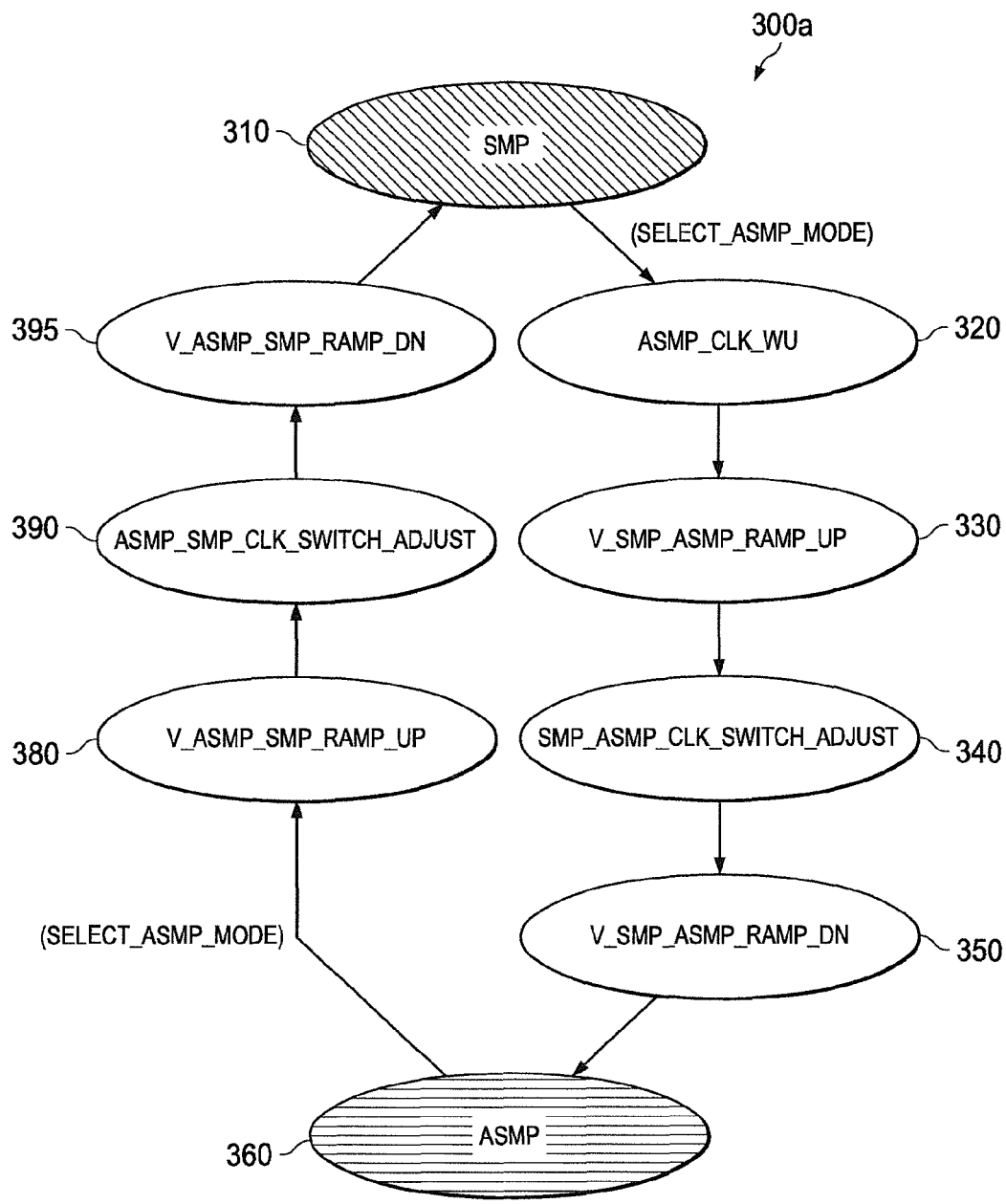
FIG. 6A illustrates another embodiment of a finite state machine (FSM) for use with the system shown in FIG. 6 according to the present disclosure.

As will be appreciated, the processing system 200a shown in FIG. 6 further includes a process or method 300a performed or implemented by the FSM 262a. As will be appreciated, the process/functionality of the FSM 262a is the same as the process/functionality of the FSM 262, except for the elimination of state 360 in the state machine. FIG. 6A illustrates the FSM 262a and when compared to the FSM 262 illustrated in FIG. 3A, it is readily understood that all the remaining states and transitions are essentially the same. As will be appreciated, the process or method flow of the FSM 262a is similar to the process or method flow of the FSM 262 shown in FIGS. 3B and 3C, except for the modification as discussed. These similar process or flow diagrams have been omitted herein, for sake of brevity.

Figure 7:
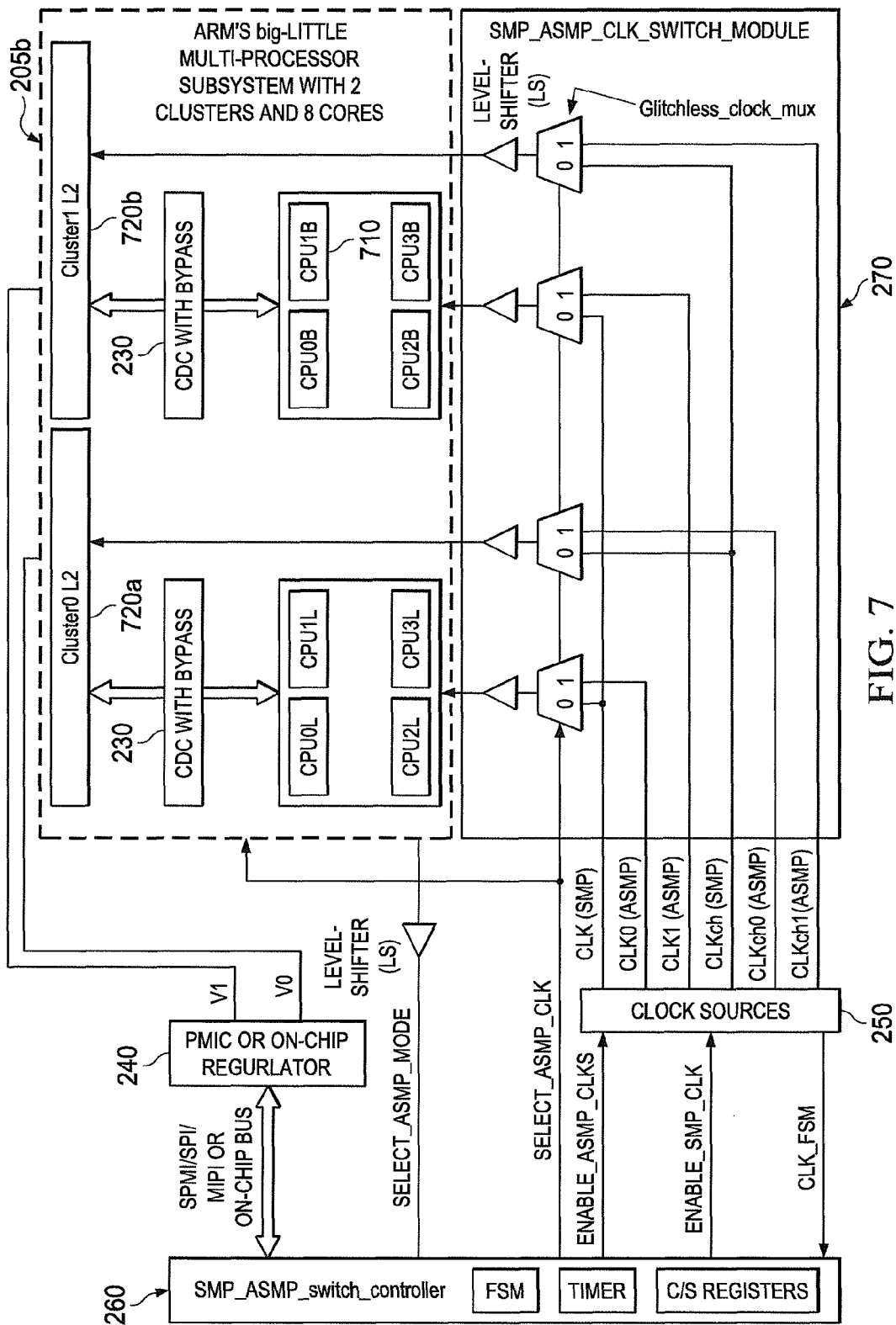
FIG. 7 is a diagram illustrating another embodiment of a multiprocessing system according to the present disclosure.

Now turning to FIG. 7, there is shown a detailed diagram illustrating a more specific embodiment of another processing system 200b in accordance with the present disclosure. The processing system 200b is the similar to the processing system 200 illustrated in FIG. 2, except the multi-processor cores and caches subsystem 205b includes a specific architecture. FIG. 7 illustrates an example application of the present disclosure teaching(s) incorporated into a specific architecture—ARM's Big-Little multi-processor subsystem that eight (8) processor cores 710 (a through h) and two (2) clusters of L2 cache 720 (a through b). Based on the two clusters of L2 cache, the system 200*b* requires only two stages of processor/L2 cache pairs. Further, various components shown therein, including 230, 240, 250, 260 and 270, may be the same as those shown in FIG. 2, and these may require some slight modification(s) when taking into consideration the specific architecture of the processors and cache subsystem 205*b*. These modifications would be readily understood by those of skill in the art. In addition, the concepts described in other embodiments, such as that shown in FIG. 6, may also be implemented in the system of FIG. 7.

In addition to the illustrative components, hardware and methods described above (with respect to FIGS. 1-8) for implementing switching between SMP and ASMP, the present disclosure further describe example methods and processes for initiating and controlling mode switching.

Dynamic mode switching between SMP and ASMP is introduced, which may be based on traffic type, processor wait time, load imbalance information and/or power consumption. As will be appreciated, other factors and types of information can be analyzed and form the basis of a decision to change (or maintain) modes. For example, SMP mode may be selected when load is light, or when load is heavy that all CPU cores are utilized and/or when L1 cache miss rate is high, while ASMP mode may be selected for heavy and/or unbalanced loads.

Static (i.e., manual) mode switching may also be implemented, such as based on processing types (e.g., computational intensive, time critical, etc.) or specific applications or application programs (e.g., the application program selects which mode to utilize).

Also described herein is a learning mechanism or process that may be utilized to facilitate intelligent mode selection in real time. For example, the learning system can determine whether SMP or ASMP mode would consume lower power for specific traffic or processing scenarios.

Figure 8:
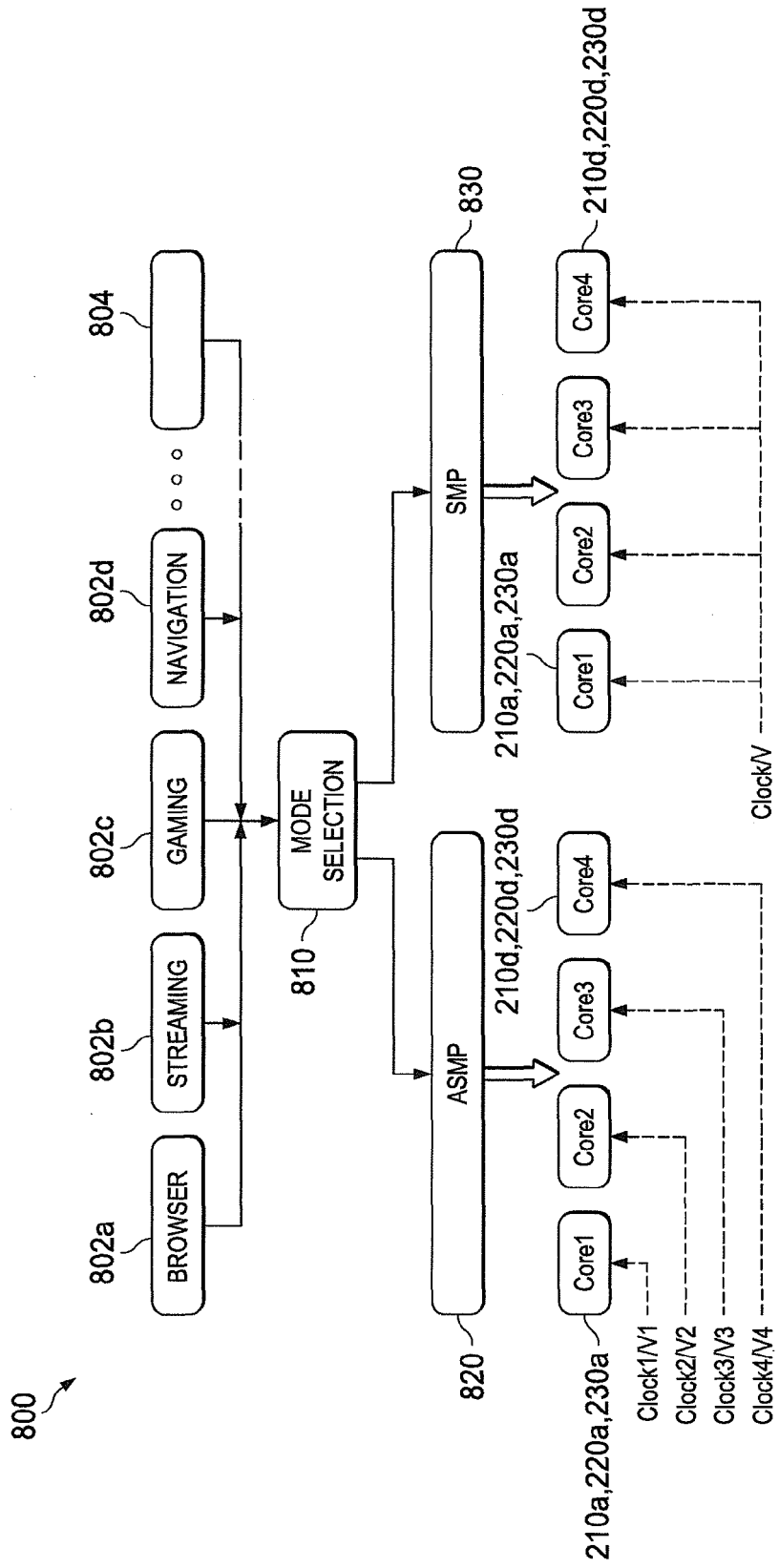
FIG. 8 is a diagram of an architecture (method or process) for initiating and controlling SMP/ASMP mode switching.

Turning now to FIG. 8, there is shown conceptually an architecture (method or process) 800 for initiating and controlling SMP/ASMP mode switching. Mode selection can be based on the type of processing or application desired, as well as other information or factors. As shown, the processing or application 802 may be a browser application 802*a*, a streaming application 802*b*, a gaming application 802*c* or a navigation 802*d*. Other factors/information 804 may also be considered.

As an example, assuming the streaming application 802*b* requires multi-processing, a mode selection device 810 determines whether processing tasks associated with that application should be performed in the SMP or ASMP mode. The system software/OS does this determination and makes the decision. The system may allocate a single processor to issue the command to the controller, but generally the decision is implemented at system-level/OS-level. This decision may be based on static information, dynamic information or a combination thereof. In one example, it could be predetermined that all video encoding applications will use SMP mode. In another example, all video streaming applications will use ASMP mode unless the current loading of the CPU is so heavy that all CPU cores are utilized. Other variations can be programmed and utilized to render the decision about whether to switch from one mode to the other.

In one embodiment, a look-up table may be consulted when single processing tasks are required. In another embodiment, comparison of power may be a factor used to select which mode when there are multiple processing tasks. For example, when a user is working on emails while listening to music simultaneously, ASMP can be selected.

After determining which mode should be selected, the device 810 issues the appropriate signal (e.g., high/low) on the SELECT_ASMP_MODE control signal (See, FIG. 2). As will be appreciated, the current mode of operation may already be the selected mode (and in such case the SELECT_ASMP_MODE signal will not transition).

Depending on the SELECT_ASMP_MODE signal, the system 200 will operate in the ASMP mode (820) or the SMP mode (830). When in the ASMP mode, the Core1 (elements 210*a*, 220*a*, 230*a*), the Core2 (elements 210*b*, 220*b*, 230*b*), the Core3 (elements 210*c*, 220*c*, 230*c*) and the Core4 (elements 210*d*, 220*d*, 230*d*) each operate with independent clock signals/frequencies and supply voltages. When in the SMP mode, the Core1 through Core4 operate with the same clock signal/frequency and supply voltage. The details of the SMP and ASMP modes (and mode switching) have been described more fully above.

Figure 9:
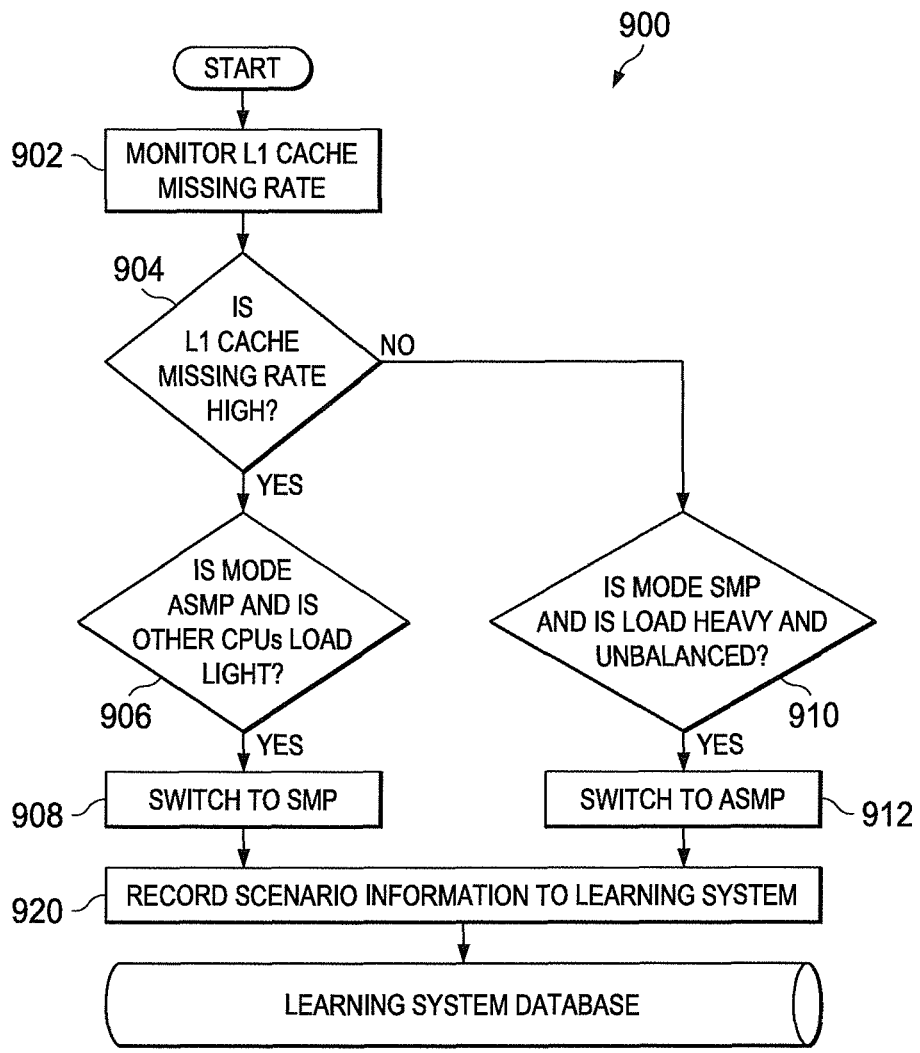
FIG. 9 illustrates an example dynamic mode switching method or process according to the present disclosure.

Now turning to FIG. 9, there is shown an example mode switching method or process 900 in accordance with the present disclosure. During operation of the system 200, L1 cache (specific to a processor core) miss rate is continuously monitored (step 902). The miss rate is compared to a predetermined threshold (step 904). If this miss rate is high (exceeds threshold), the process determines whether the current processing mode of the system 200 is ASMP and whether the other CPUs' loads are heavy/light (using another threshold) (step 906). If yes, the system 200 switches from ASMP mode to SMP mode (step 908). If no, the system 200 continues in ASMP mode.

If the L1 cache miss rate is not high, the process determines whether the current processing mode of the system 200 is SMP and whether the processing load is heavy and unbalanced (step 910). If yes, the system 200 switches from SMP mode to ASMP mode (step 912). If no, the system 200 continues in SMP mode.

The process 900 illustrated in FIG. 9 also includes an optional intelligent learning process. When the system 200 switches from ASMP mode to SMP mode (step 908) or from SMP mode to ASMP mode (step 912), the scenario information relevant to the determination to switch is recorded in a learning system database (step 920). The scenario information may be any part or all of the information utilized by the system to make the decision to switch modes. In the example shown, the scenario information may include L1 cache miss rate and load information (light/heavy, balanced/unbalanced).

Figure 10:
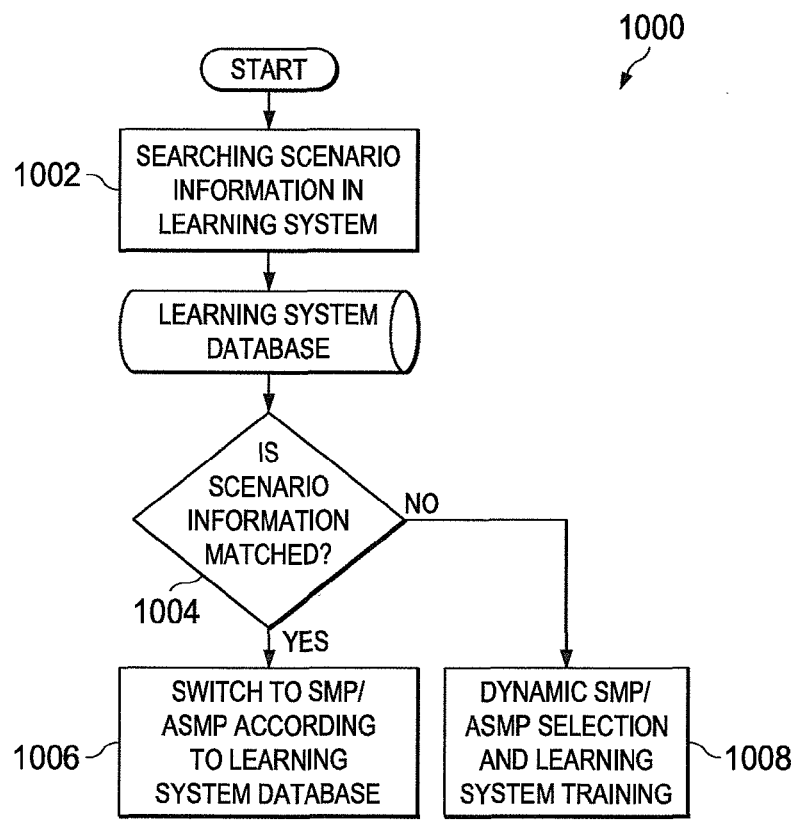
FIG. 10 illustrates alternative mode switching method or process according to the present disclosure.

Now turning to FIG. 10, there is shown an example of an alternative mode switching method or process 100 based on historical data and intelligence from previous experiences. During operation, the system 200 periodically obtains dynamic system information (e.g., current scenario information) and searches the learning system database (step 1002). The current scenario information is compared to scenario information stored in the learning system database to determine whether there is a match (step 1004). If yes, the system 200 switches between ASMP mode and SMP mode in accordance with the information associated with the match scenario information (step 1006). As will be appreciated, this may result in a mode switch, but may also result in maintain current mode operation. If no, the system performs dynamic SMP/ASMP selection and learning system training—such as the process/method described in FIG. 9.

Figure 11:
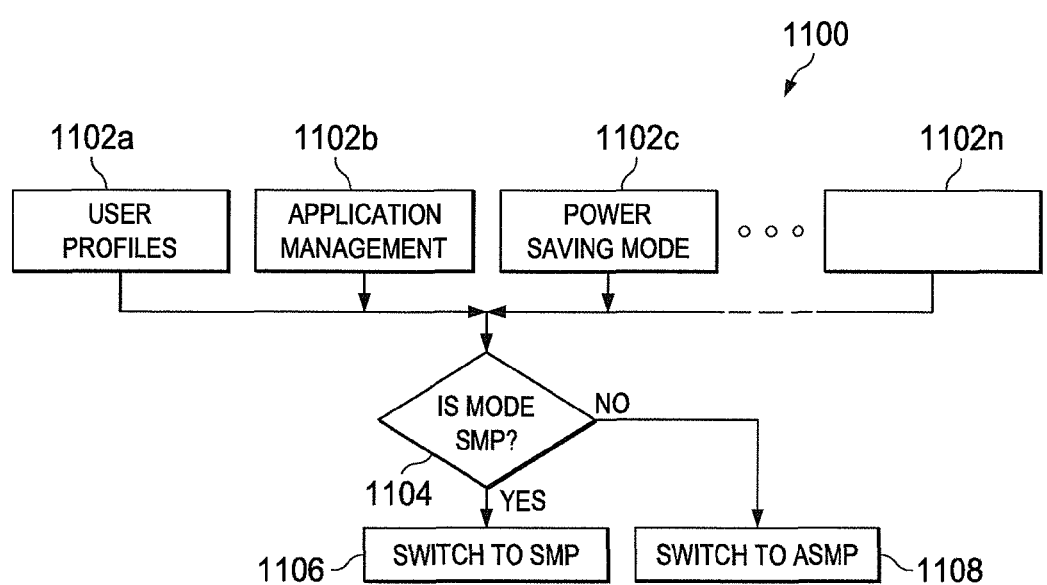
FIG. 11 illustrates an example static mode switching method or process according to the present disclosure.

FIG. 11 illustrates an example static mode switching method or process 1100 according to the present disclosure. In general terms, this process determines whether the system 200 should be operating in SMP or ASMP mode based on static or "manual" information or factors 1102. For example, the determination of which mode may be "statically" assigned based on a multitude of information or factors, e.g., user profiles 1102a, application management 1102b, power saving mode 1102c and other information or requirements 1102n.

The system 200 determines whether it should be operating in SMP mode or ASMP mode based on applicable information or input (1104). For example, if a given user profile is associated with a particular mode—meaning that processing associated with the given user should always be performed in the particular mode—then the system 200 will switch to the particular mode for processing if needed. In another example, if a particular application should always be performed in one mode, then the system 200 will perform processing for that application in the particular mode—and will switch if needed. In yet another example, if the system 200 is placed in power saving mode, that mode may require the system 200 to operation in either ASMP or SMP mode— whichever mode has been programmed to be the mode that will save power.

As shown, system 200 determines whether the processing task should be performed in the SMP mode (or ASMP mode). If SMP mode should be utilized—and the system is not currently in the SMP mode—the system switches from ASMP mode to SMP mode (step 1106). Similarly, if ASMP mode should be utilized (not SMP mode)—and the system is currently in the SMP mode—the system switches from SMP mode to ASMP mode (step 1108).

As will be appreciated, in one embodiment, the system, processes, methods and devices described herein may be utilized in a mobile environment, including incorporated within a mobile device/small computing device or a base station, and the like. Such devices may be, for example, configured to transmit and/or receive wireless signals. The devices may be any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, wearable electronic device or consumer electronics device.

The devices will include at least one processing system 200 (as described herein) which implements various processing operations of the device. This may include, for example, signal coding, data processing, video/audio processing, power control, input/output processing, or any other functionality contemplated for a device.

The processing system 200 also supports the methods and teachings described herein, and may include additional components and processor(s) (e.g., microcontroller, digital signal processor, field programmable gate array, or application specific integrated circuit).

The devices incorporating the processing system 200 may also include at least one transceiver configured to modulate data or other content for transmission by at least one antenna. The transceiver is also configured to demodulate data or other content received by the at least one antenna. Each transceiver includes any suitable structure for generating signals for wireless transmission and/or processing signals received wirelessly. Each antenna includes any suitable structure for transmitting and/or receiving wireless signals. One or multiple transceivers could be used in the device, and one or multiple antennas could be used.

These devices may also include one or more input/output devices to facilitate interaction with a user. Each input/output device includes any suitable structure for providing information to or receiving information from a user, such as a speaker, microphone, keypad, keyboard, display, or touch screen.

In addition, these devices may utilize memory described above, or may include other memory, for storing instructions and data used, generated, or collected by the device. For example, the memory could store software or firmware instructions executed by the processing system 200. The other memory may include any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Additional details regarding the mobile/small computing devices are known to those of skill in the art. As such, these details are omitted here for clarity.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of non-volatile medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A multi-processing system, comprising:
 a plurality of processors configured to operate in one of a symmetric multiprocessing (SMP) mode or an asymmetric multi-processing (ASMP) mode;
 a clock switch circuit configured to output a respective clock signal to each processor, each respective clock signal to provide a frequency as one of an SMP clock and a plurality of ASMP clocks, each ASMP clock having a different respective frequency;

a power management circuit configured to output a respective power supply to each processor, each power supply to provide one of an SMP voltage level and a plurality of ASMP voltage levels; and a controller coupled to the plurality of processors, the clock switch circuit and the power management circuit, the controller configured to:

control switching the SMP clock to the plurality of processors in the SMP mode; control switching each of the plurality of ASMP clocks to a respective one of the plurality of processors in the ASMP mode;

control switching the SMP voltage level to the plurality of processors in the SMP mode;

control switching each of the plurality of ASMP voltage levels to a respective one of the plurality of processors in the ASMP mode; and control switching from the ASMP mode to the SMP mode, wherein switching from the ASMP mode to the SMP mode comprises:

enabling and activating the SMP clock for a predetermined warm-up period; and after elapse of the predetermined warm-up period, causing the clock switch circuit to provide the SMP clock to the plurality of processors;

cache memory coupled to and configured for use with the plurality of processors; and a clock-domain crossing (CDC) and bypass circuit responsive to the controller and coupled to the plurality of processors and the cache memory, and configured to provide a clock-domain crossing function between the plurality of processors and the cache memory during the second mode and provide a bypassing function during the first mode.

2. The system in accordance with claim 1, wherein during the SMP mode, each processor of the plurality of processors receives the SMP clock.

3. The system in accordance with claim 2, wherein during the SMP mode, each processor of the plurality of processors receives the SMP voltage level.

4. The system in accordance with claim 1, wherein during the ASMP mode, each processor of the plurality of processors receives an ASMP clock of a frequency different from the frequencies received by other processors of the plurality of processors.

5. The system in accordance with claim 4, wherein during the ASMP mode, each supply voltage received at each of the plurality of processors is different.

6. The system in accordance with claim 1, wherein the controller comprises a finite state machine (FSM).

7. The system in accordance with claim 1, wherein the controller comprises at least one of a processor, a microcontroller or logic circuitry.

8. The system in accordance with claim 1, further comprising:

a clock generation circuit coupled to the controller and configured to generate and output a plurality of clock signals;

an operating voltage generation circuit coupled to the controller and configured to generate and output a plurality of operating supply voltage signals; and a switching circuit disposed between the clock generation circuit and the plurality of processors and configured to receive the plurality of clock signals and output a second plurality of clock signals to the plurality of processors, wherein during the SMP mode, the second plurality of clock signals each have a same predetermined frequency, and during the ASMP mode, the second plurality of clock signals each have a different predetermined frequency.

9. The system of claim 1, wherein the controller is further configured to control switching from the SMP mode to the ASMP mode, wherein switching from the SMP mode to the ASMP mode comprises:

enabling and activating the plurality of ASMP clocks for a second predetermined warm-up period; and after elapse of the second predetermined warm-up period, causing the clock switch circuit to provide each of the plurality of ASMP clocks to the respective one of the plurality of processors.

10. An apparatus, comprising:

a plurality of processors configured to perform multiprocessing functions;

a controller configured to control operation of the plurality of processors in a first mode and a second mode;

a clock generation circuit coupled to the controller and configured to generate and output a first mode clock and a plurality of second mode clocks, each second mode clock having a different, respective frequency;

an operating voltage generation circuit coupled to the controller and configured to generate and output a plurality of operating supply voltages wherein, during the first mode, a same operating supply voltage is applied to each of the plurality of processors and, during the second mode, a different operating supply voltage of the plurality of operating supply voltages is applied to each respective processor of the plurality of processors;

a switching circuit disposed between the clock generation circuit and the plurality of processors and configured to selectively couple the first mode clock to each of the plurality of processors during the first mode and to selectively couple each of the plurality of second mode clocks to a different respective processor during the second mode;

cache memory coupled to and configured for use with the plurality of processors; and clock-domain crossing (CDC) and bypass circuit responsive to the controller and coupled to the plurality of processors and the cache memory, and further configured to provide a clock-domain crossing function between the plurality of processors and the cache memory during the second mode and provide a bypassing function during the first mode;

wherein the controller is further configured to control switching from the second mode to the first mode, wherein switching from the second mode to the first mode comprises:

enabling and activating the first mode clock for a predetermined warm-up period; and after elapse of the predetermined warm-up period, causing the switching circuit to couple the first mode clock to the plurality of processors.

11. The apparatus in accordance with claim 10, wherein the controller comprises a finite state machine (FSM).

12. The apparatus in accordance with claim 10, wherein the controller comprises at least one of a processor, a microcontroller or logic circuitry.

13. The apparatus in accordance with claim 10, wherein the switching circuit comprises a plurality of glitchless multiplexers.

14. The apparatus in accordance with claim 10, wherein the switching circuit dynamically switches during operation of the apparatus between the first mode and the second mode.

15. The apparatus in accordance with claim 14, wherein the switching circuit dynamically switches in response to at least one of the following: load information, use information, cache miss rate, memory bandwidth information or power consumption information.

16. The apparatus of claim 10, wherein the controller is further configured to control switching from the first mode to the second mode, wherein switching from the first mode to the second mode comprises:
enabling and activating the plurality of second mode clocks for a predetermined warm-up period; and
after elapse of the predetermined warm-up period, causing the clock switch circuit to couple the each of the plurality of second mode clocks to the respective one of the plurality of processors.

17. A method for switching a processing system having a plurality of processors between a symmetric multiprocessing (SMP) mode of operation and an asymmetric multiprocessing (ASMP) mode of operation, the method comprising:
receiving an instruction to switch between the SMP mode of operation and the ASMP mode of operation;
switching the mode of operation of the processing system in accordance with the received instruction, wherein switching the mode of operation comprises, enabling a plurality of ASMP clock signals and when the processing system is currently operating in the SMP mode, generating the plurality of ASMP clock signals each having a different ASMP predetermined frequency and inputting each of the plurality of ASMP clock signals to a different processor of the plurality of processors for operation of the respective processor at the respective ASMP predetermined frequency, and when the processing system is currently operating in the ASMP mode, generating an SMP clock signal having an SMP predetermined frequency, and inputting the SMP clock signal to each processor of the plurality of processors for operation of each processor at the SMP predetermined frequency;
when the processing system is currently operating in the SMP mode, generating a plurality of ASMP operating voltage signals, prior to inputting each of the plurality of ASMP clock signals to a different processor of the plurality of processors, increasing each operating voltage of each processor to a max voltage level equal to or greater than a highest voltage level of the plurality of ASMP operating voltage signals, after increasing each operating voltage to the max operating voltage level, inputting the plurality of ASMP clock signals to the respective different processors of the plurality of processors, and decreasing at least one operating voltage of at least one processor to a voltage level less than the max voltage level; and
when the processing system is currently operating in the ASMP mode, generating an SMP operating voltage signal, prior to inputting the SMP clock signal to each of the plurality of processors, increasing each operating voltage of each processor to a max voltage level equal to or greater than a highest voltage level of the current ASMP operating voltages of each processor of the plurality of processors, after increasing each operating voltage to the max operating voltage level, inputting the SMP clock signal to each processor of the plurality of processors, and decreasing at least one operating voltage of at least one processor to a voltage level less than the max voltage level.

18. The method in accordance with claim 17, wherein switching the mode of operation is controlled according to a finite state machine (FSM).

19. The method in accordance with claim 17, wherein during the SMP mode, inputting a predetermined operating voltage signal to each of the plurality of processors, each of the predetermined operating voltage signals having a same value.

20. The method in accordance with claim 17, wherein during the ASMP mode, inputting a predetermined operating voltage signal to each of the plurality of processors, each of the predetermined operating voltage signals having different values.

21. The method in accordance with claim 17, further comprising:
dynamically switching between the SMP mode of operation and the ASMP mode of operation in response to at least one of the following: load information, use information, cache miss rate, memory bandwidth information or power consumption information.

* * * * *

UNITED STATES PATENT AND TRADEMARK OFFICE
CERTIFICATE OF CORRECTION

Page 1 of 1

PATENT NO. : 9,952,650 B2
APPLICATION NO. : 14/516314
DATED : April 24, 2018
INVENTOR(S) : Chen et al.

It is certified that error appears in the above-identified patent and that said Letters Patent is hereby corrected as shown below:

On the Title Page

In item (71), in "Applicant", in Column 1, Line 1, after "Technologies", insert --,--

On page 2, in Column 2, under "Other Publications", Line 9, delete "Wiltten" and insert --Written-- therefor In the Specification In Column 5, Line 48, delete "Mhz" and insert --MHz-- therefor In the Claims In Column 15, Line 11, in Claim 1, after "mode;", insert --¶--

Signed and Sealed this
Thirtieth Day of July, 2019

Andrei Iancu
*Director of the United States Patent and Trademark Office*